Dec. 9, 1952 W. CALL 2,621,020
CHAIN BINDER
Filed Feb. 2, 1951 2 SHEETS—SHEET 1
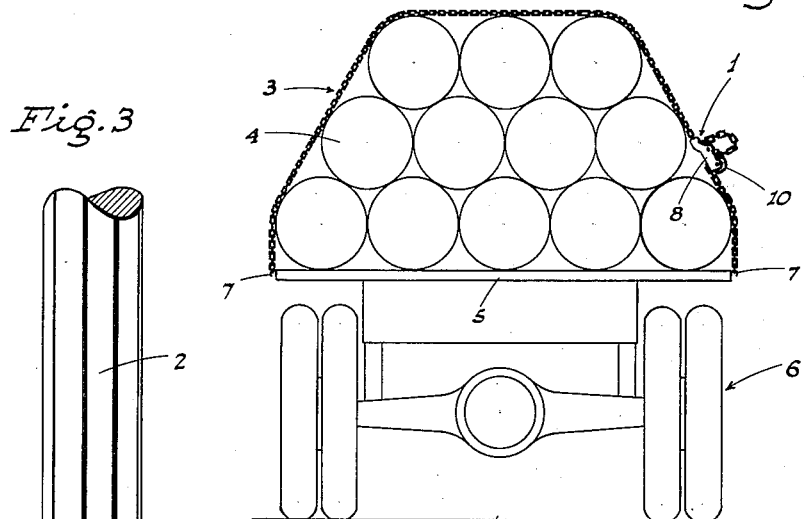
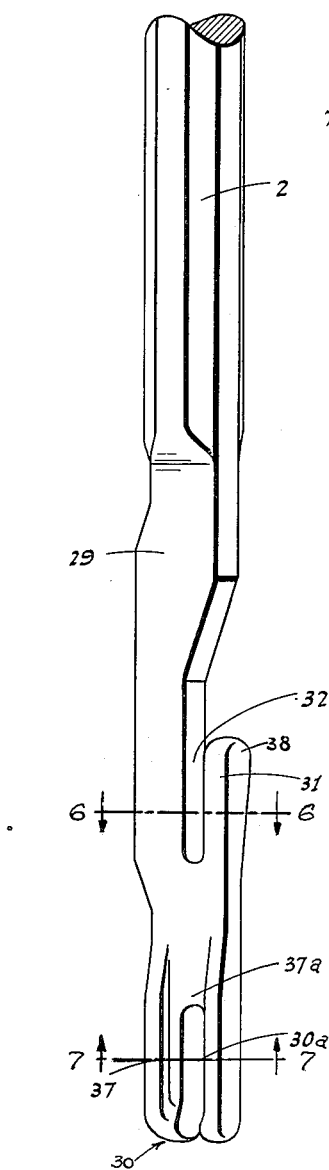
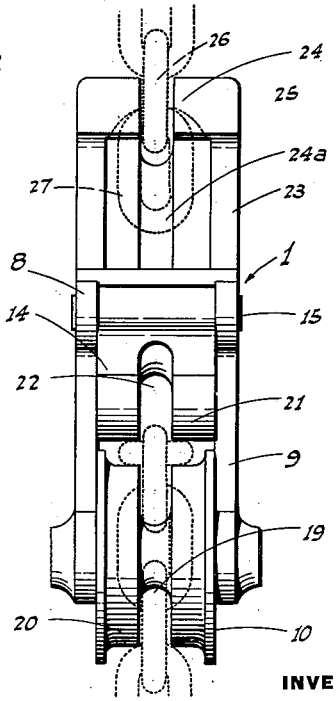
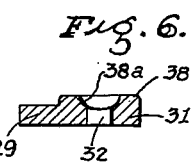
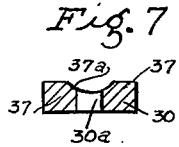
INVENTOR
Wilson Call
BY
ATTORNEYS Dec. 9, 1952 W. CALL 2,621,020
CHAIN BINDER
Filed Feb. 2, 1951 2 SHEETS—SHEET 2
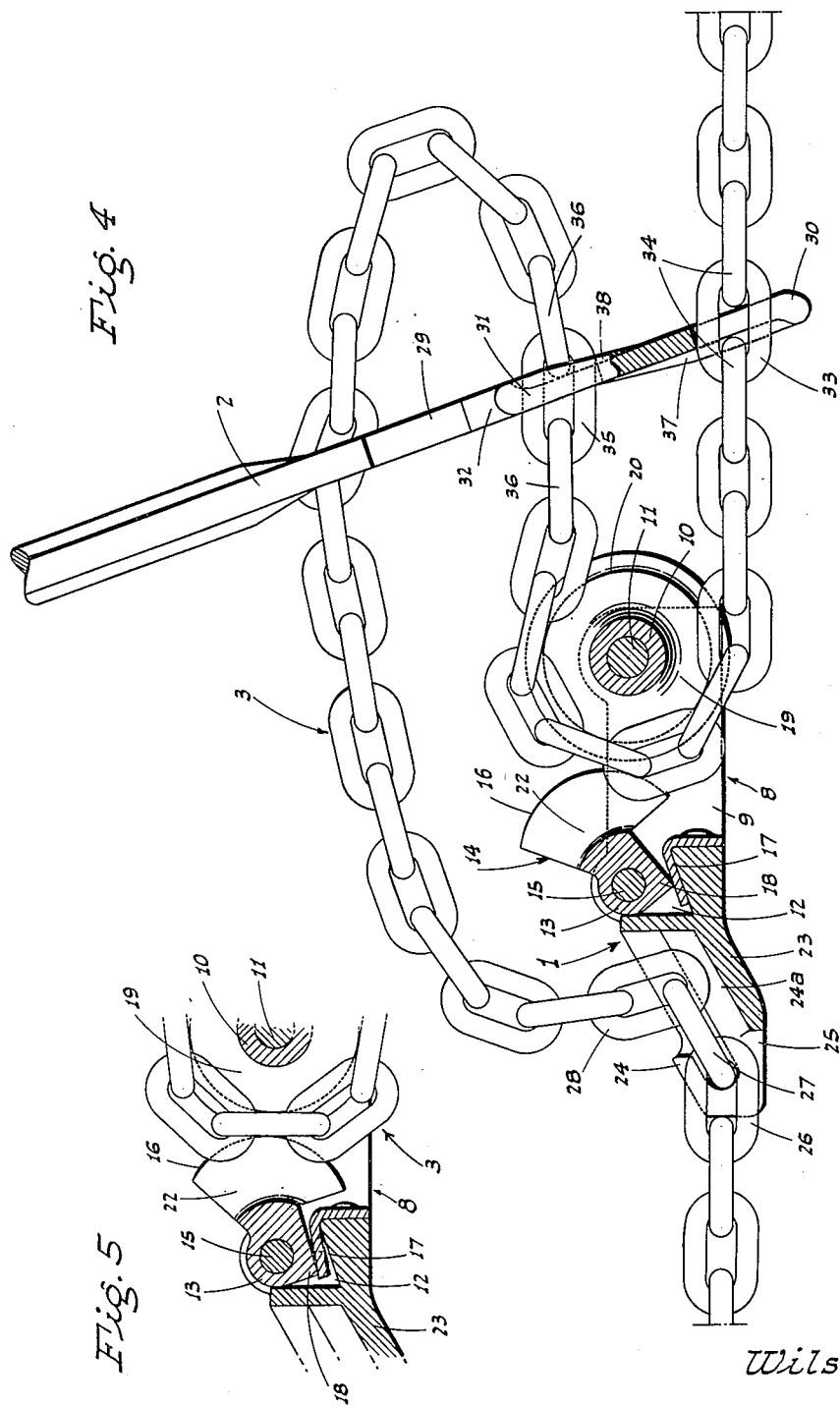
INVENTOR
Wilson Call
BY
ATTORNEYS Patented Dec. 9, 1952

2,621,020

UNITED STATES PATENT OFFICE 2,621,020

CHAIN BINDER

Wilson Call, Oildale, Calif.

Application February 2, 1951, Serial No. 208,994

3 Claims. (Cl. 254—78)

This invention is directed to, and it is an object to provide, a novel chain binder; i. e. a device to tighten or bind a chain about a load, as on a truck, by reducing the effective length of the chain and then locking it against accidental release.

Another important object of the invention is to provide a chain binder which comprises a novel chain locking dog unit, and a chain tightening crowbar for cooperation therewith; the bar being used in a unique manner to tension the chain preparatory to its being locked by the dog unit.

An additional object of the invention is to provide a chain binder which is compact, readily portable, convenient to use, and yet when in use assures of positive but releasable locking of a tightened chain. The present device has certain features in common with the binder shown in my subsequent and now co-pending application Serial No. 245,027, filed September 4, 1951.

It is also an object of the invention to provide a chain binder which is designed for ease and economy of manufacture.

A further object of the invention is to produce a practical device and one which will be exceedingly effective for the purpose for which it is designed.

These objects are accomplished by means of such structure and relative arrangement of parts as will fully appear by a perusal of the following specification and claims.

In the drawings:

Fig. 1 is a diagrammatic rear end elevation of a truck and load, showing a load retention chain with one of the locking dog units as used in connection therewith.

Fig. 2 is an enlarged top plan view of the locking dog unit, as in use.

Fig. 3 is a fragmentary perspective view of the chain tightening crowbar, detached.

Fig. 4 is an enlarged side elevation, partly in section, showing the locking dog unit during tightening of the chain.

Fig. 5 is a similar but fragmentary view showing the locking dog unit in locked position.

Fig. 6 is a cross section on line 6—6 of Fig. 3.

Fig. 7 is a cross section on line 7—7 of Fig. 3.

Referring now more particularly to the characters of reference on the drawings, the novel chain binder comprises a chain locking dog unit, indicated generally at 1, and a chain tightening crowbar, indicated generally at 2, adapted for cooperation with said unit.

When the chain locking dog unit is in use, it is engaged with a chain intermediate the ends thereof in the manner shown in Fig. 1. In this figure, the chain 3 is shown as engaged over a load 4 on the bed 5 of a truck 6. Opposite ends of the chain 3 are hooked to corresponding sides of the truck bed 5, as at 7.

The chain locking dog unit 1 engages with the chain intermediate its ends and is operative to releasably lock the same under tension, such unit being constructed as follows:

The chain locking dog unit comprises an elongated one-piece body 8 formed at one end portion as a U-shaped yoke or clevis 9 in which a roller 10 is journaled on a transverse pivot pin 11; such roller being of substantial diameter although there is adequate clearance between the inner portion of the roller and the transverse or central part of the body 8.

Such transverse or central portion of the body 8 is notched from the top, as at 12, to form a recess for the reception of a mounting ear 13 which projects from a segmental dog 14 disposed in cooperative relation to the roller 10. The mounting ear 13 is secured in the notch 12 by means of a transverse pivot pin 15.

The segmental dog 14 is formed with an arcuate peripheral edge 16 eccentric to the pivot pin 15 and consequently eccentric to the periphery of the roller 10; the eccentricity being in a direction such that when the dog 14 swings inwardly from an out-swung or released position, the peripheral edge 16 of the dog progressively works closer toward the roller.

A leaf spring 17, secured in the body, works against a lower corner 18 of the ear 13 and normally acts to swing such ear in a direction to cause the dog 14 to swing inwardly.

The roller 10 is formed with a central relatively deep circumferential groove 19, and the face 20 of such roller is relatively wide.

Similarly, the dog 14 has a relatively wide face 21 and such dog is formed with a deep circumferential groove 22.

At the end opposite the roller 10, the body 8 includes a hook shank 23 formed at its outer or free end with a hook 24 which opens in the direction of the dog 14; the hook shank 23 being formed with a longitudinal groove 24a while the hook 24 is centrally and longitudinally sloted therethrough from top to bottom, as at 25.

When the above described chain locking dog unit is in use, the chain 3 is engaged intermediate its ends with the hook 24; one of the edgewise links 26 extending through the slot 25 while the next innermost flatwise link 27 lies on the hook shank 23; the next innermost edgewise link 28 turning in the longitudinal groove 24a. This effectively anchors one portion of the chain to the end of the chain locking dog unit opposite the roller.

Another portion of the chain turns about the roller, extending through the clevis 9, and it is this portion of the chain that is tightened when the device is placed in use.

Such tightening of the chain is accomplished as follows:

The crowbar 2 is formed, at its working end, with a flat sided tip 29 whose immediate outer end is forked, as at 30 to provide a longitudinally extending slot 30a open to the outer end of the tip to receive a chain link edgewise. Inwardly of the fork 30 a distance closely approximating the diameter of the roller 10, the flat-sided tip 29 is formed with a hook 31, the hook throat or slot 32 being parallel to and longitudinally alined with slot 30a and opening at its end furthest from the fork laterally from said tip 29 180 degrees apart from the fork 30.

To tighten the chain, the fork 30 is engaged over an edgewise link 33 between a pair of the flatwise links 34 of the reach of the chain running to the roller 10, as clearly shown in Fig. 4. At the same time, the hook 31 is engaged with an edgewise link 35 between a pair of the flatwise links 36 of the corresponding reach of the chain which runs off the other side of the roller 10, and which reach is included in the chain loop which extends between said roller and the hook 24.

With the crowbar 2 thus engaged, it is swung in a direction to cause shortening of the effective length of said chain, i. e. enlargement of the chain loop between roller 10 and hook 24; the chain, as it passes around the roller 10 escaping the dog 14 as the latter then tends to swing outwardly.

However, the dog 14 rides the chain, and as soon as the crowbar 2 is released such dog binds the chain against the roller 10 effectively locking said chain under tension. See Fig. 5.

The roller 10 is circumferentially grooved, as at 19, and the dog 14 is circumferentially grooved, as at 22, so that the edgewise links may project into such grooves with a flatwise link frictionally bound between the adjacent faces of the dog 14 and roller 10, as shown. In order to prevent slippage of the chain links from the fork slot 30a and the hook throat 32 when the crowbar 2 is in use, one face of the fork 30 from its outer end is provided with outwardly projecting shoulders 37 extending laterally apart from the outer end of slot 30a and then along and laterally out from the sides of said slot, to form a groove 37a to receive the end of a flatwise link 34. Similarly, the opposite face of hook 31 is formed with shoulders 38 defining a longitudinal groove 38a along throat 38 to receive the end of a flatwise link 36.

With the described chain binder, a chain extending about a load may be readily and effectively tightened, and locked in tightened position by the dog unit 1 and with the simple manipulation of the crowbar 2; the device thereafter positively, but releasably, maintaining the chain under tension, as about a load 4 on a truck bed 5.

To release the device requires merely a reversal of the tightening operation; i. e. the crowbar is used to move the chain sufficiently for release of the dog 14 and then the latter is manually held out of play until the chain runs slack.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A device for moving substantially parallel reaches of a chain-binder engaged chain in opposite directions simultaneously to tighten one of said reaches; the device comprising a crowbar, a chain-link straddling fork on the outer end of the crowbar extending lengthwise thereof and including a longitudinal opening open to said end of the crowbar, and a hook on the crowbar adjacent but short of said fork and having a chain-link receiving throat parallel to and longitudinally alined with the fork opening and opening in a direction away from the fork and laterally of the crowbar.

2. A combination, as in claim 1, in which one face of the fork, and the opposite face of the hook, are provided with outwardly projecting shoulders extending laterally out from the open end of the fork opening and hook throat and then lengthwise of such openings laterally out therefrom to provide chain-link engaging grooves therebetween to prevent chain slippage.

3. A chain binder comprising an elongated body, a clevis formed in and rigid with the body at one end thereof, a roller journaled in the clevis at its outer end, a dog pivoted in the clevis at its inner end for wedging engagement with a link of a chain wrapped about the roller, means at the other end of the body forming a link-engaging hook rigid with the body and a hook shank projecting toward the dog and together with the hook, being formed with a longitudinal guide groove to receive and locate a plurality of links edgewise and crosswise with one crosswise link engaged with the hook, and a wall in the body forming a separation between the inner end of the groove and the adjacent end of the clevis and preventing contact of the chain links in the groove with the dog.

WILSON CALL.

REFERENCES CITED

The following references are of record in the file of this patent:

UNITED STATES PATENTS

| Number | Name | Date |
|---|---|---|
| 21,135 | Jackson | Aug. 10, 1858 |
| 333,787 | Sickler et al. | Jan. 5, 1886 |
| 651,257 | Mortenson | June 5, 1900 |
| 813,277 | Cage | Feb. 20, 1906 |
| 1,119,783 | Schulte | Dec. 1, 1914 |
| 2,014,201 | Field | Sept. 10, 1935 |

FOREIGN PATENTS

| Number | Country | Date |
|---|---|---|
| 643,564 | Germany | Apr. 12, 1937 |